July 17, 1934. J. D. COCHIN Re. 19,239

VALVE FOR LIFTING DEVICES

Original Filed May 16, 1927 2 Sheets-Sheet 1

INVENTOR.

JOHN D. COCHIN

BY

J. E. Trabucco.

ATTORNEY.

July 17, 1934. J. D. COCHIN Re. 19,239

VALVE FOR LIFTING DEVICES

Original Filed May 16, 1927 2 Sheets-Sheet 2

INVENTOR.
JOHN D. COCHIN
BY
J. E. Trabucco
ATTORNEY.

Reissued July 17, 1934

Re. 19,239

UNITED STATES PATENT OFFICE 19,239

VALVE FOR LIFTING DEVICES

John D. Cochin, San Francisco, Calif.

Original No. 1,764,004, dated June 17, 1930, Serial No. 191,579, May 16, 1927. Application for reissue July 29, 1931, Serial No. 553,865

9 Claims. (Cl. 277—1)

This invention relates to improvements in valves adapted for use with lifting devices.

An object of my invention is to provide a valve for controlling the movement of a lifting device whereby a vehicle may be elevated above the ground to enable the underneath portion of the vehicle to be readily accessible for the purpose of repairing or cleaning the same.

Another object of my invention is to provide an improved valve for use with apparatus for elevating automobiles or other objects above the surface of the ground, in which is embodied suitable means for safely maintaining the load at any desired height.

Another object of my invention is to provide an improved valve for use with apparatus for elevating a load above the ground, which serves as a suitable means for instantaneously stopping the movement of the lifting part of the apparatus.

Other objects more or less apparent will present themselves or will be specifically pointed out in the description to follow.

Figure 1:
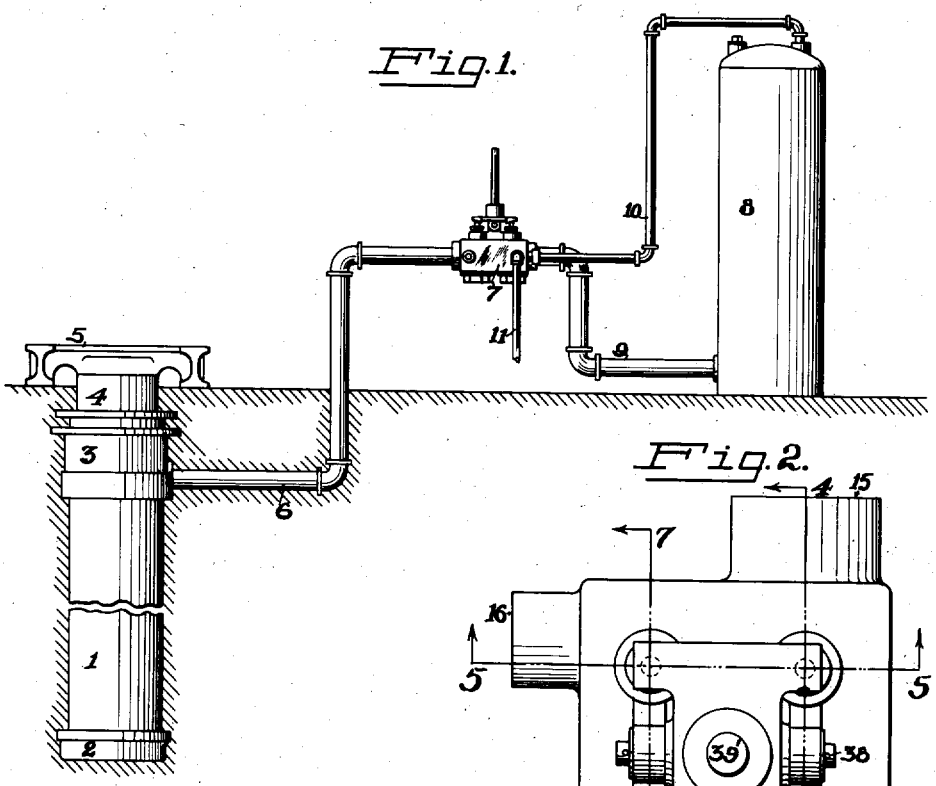
Fig. 1 is a side elevation of apparatus used for elevating vehicles or other objects with which my invention may be used.
Figure 2:
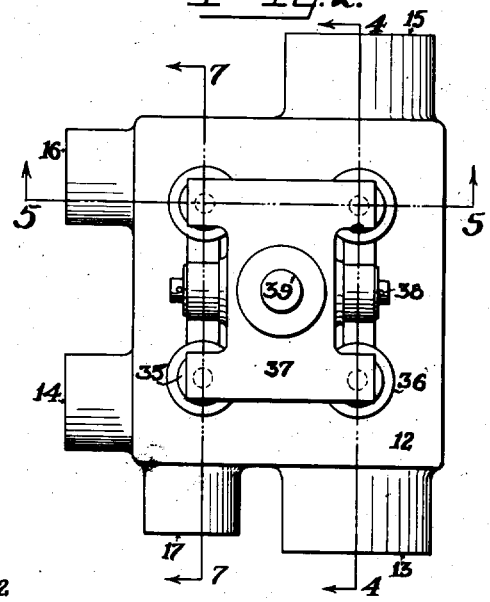
Fig. 2 is a top plan view of my improved regulating valve.
Figure 3:
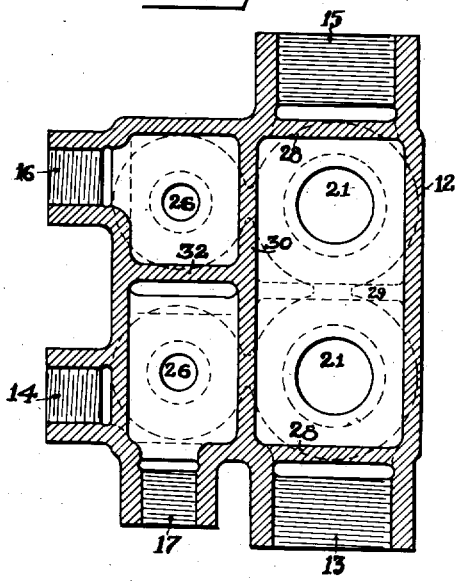
Fig. 3 is a sectional view taken on the line 3—3 of Fig. 6.
Figure 4:
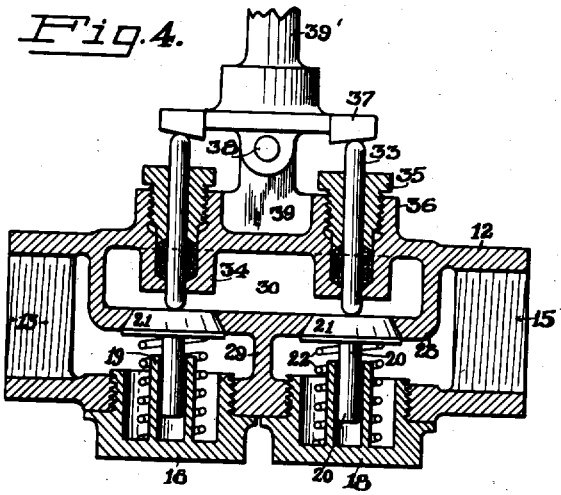
Fig. 4 is a vertical sectional view taken on the line 4—4 of Fig. 2.
Figure 5:
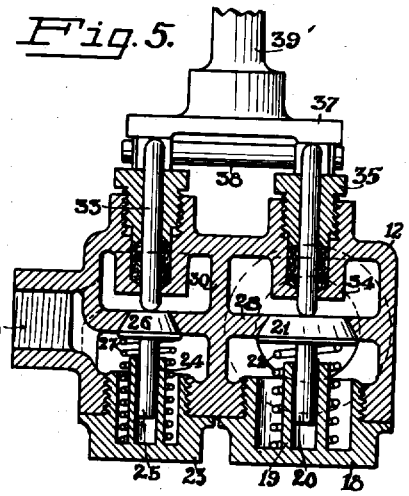
Fig. 5 is a vertical sectional view taken on the line 5—5 of Fig. 2.
Figure 7:
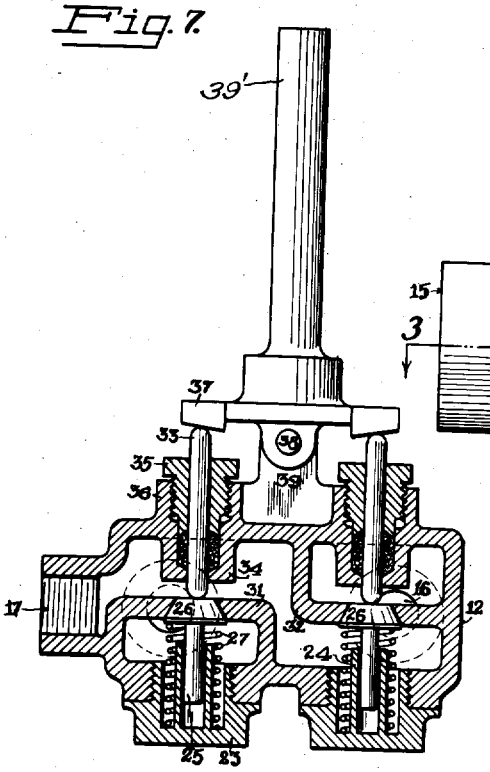
Fig. 7 is a vertical sectional view taken on the line 7—7 of Fig. 2.
Figure 6:
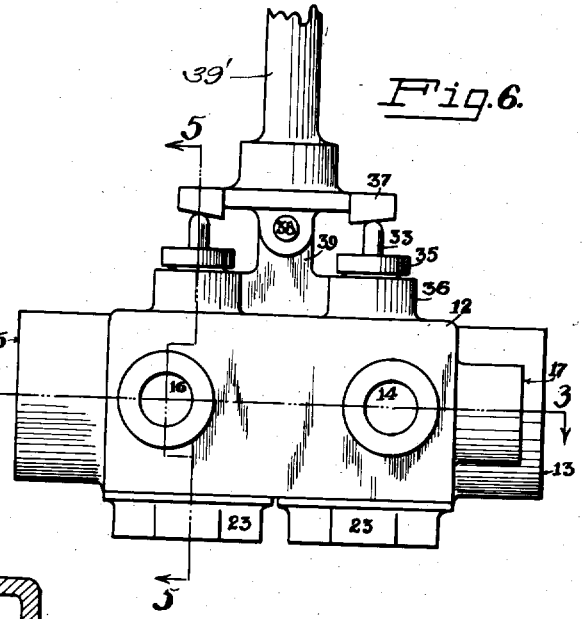
Fig. 6 is a side elevation of the regulating valve.

Referring to the drawings, the numeral 1 represents a cylindrical shaped casing having its lower end closed by a bottom plate 2, its upper end provided with a re-enforcing ring 3, and its inside circumferential surface provided with a plurality of vertically extending grooves. Movably located inside the casing 1 and the ring 3, with its circumferential surface movably contacting with the inside surface of the casing, is a ram 4 which has a rack 5 secured to its upper end. The casing 1 and the ram 4 are placed in operating position beneath the surface of the ground or floor, with the rack 5 suitably projecting above the ground so as to engage with the underneath part of a vehicle or other load to be elevated.

Extending through the ring 3 to the inside of the casing 1, is a pipe 6 which is adapted to carry oil to the inside of the casing for the purpose of elevating the ram. The oil, delivered under pressure to the inside of the casing by the pipe 6, is forced downwardly inside the grooves located in the wall of the casing, and it thereafter exerts sufficient pressure on the bottom of the ram 4 to force it and the load located on the rack 5 in an upward direction.

The pipe 6 is suitably connected at its opposite end to a control valve 7 which is adapted to deliver oil with sufficient pressure to elevate the ram 4. Connecting the control valve 7 and an oil containing tank 8 is a pipe 9 which is adapted to carry oil from the said tank to the said control valve.

Connecting the tank 8 and the control valve 7 is a pipe 10 which is adapted to carry compressed air from the control valve to the tank.

Leading from a source for supplying a quantity of compressed air, and suitably connected to the control valve 7 is a pipe 10 which is adapted to deliver sufficient quantities of compressed air for the satisfactory operation of the apparatus.

The control valve is enclosed by a casing 12 having openings or ports 13, 14, 15, 16 and 17 there-in through which a quantity of compressed air and oil may enter the casing and pass therefrom. The pipe 6 is connected to the casing at opening 15 through suitable threads located on the inside surface of the walls of the opening, while the other oil pipe 9 is similarly connected to the casing at opening 13. The pipe 11 which furnishes quantities of compressed air for the operation of the device, is connected to the casing at opening 14 through suitable threads located on the inside surface of the walls of the opening, while the other compressed air carrying pipe 10 is similarly connected to the casing at opening 17. The opening 16 is a means for allowing quantities of compressed air not required for lifting purposes to escape from the valve.

Removably screwed into the bottom of the casing 12 are two caps 18 having cylindrical shaped supports 19 extending vertically therein. Movably located in the supports 19 are valve stems 20 which carry valve heads 21, and extending around the said supports 19 with their ends contracting with the bottom of the caps 18 and the underneath side of valve heads 21 are spiral springs 22 which tend to force the valve heads upwardly and keep them seated on their valve seats, as will be later described.

Removably screwed into the bottom of the casing 12 are two caps 23 having cylindrical shaped supports 24 extending vertically therein. Movably located in the supports 24 are valve stems 25 which carry valve heads 26, and extending around the said supports 24 with their ends contacting with the bottom of the caps 23 and the underneath side of the valve heads 26 are spiral springs 27 which tend to force the valve heads upwardly and keep them seated on their valve seats, as will be later described.

Extending downwardly and horizontally inside the casing 12 from the top thereof above the valve heads 21 is a U-shaped partition member 28 having holes therein which provide seats for the valve heads 21, and joining the partition plate with the bottom of the casing is a vertically extending wall 29 which is located between the two valve stems 20. Extending vertically from the top to the bottom of the casing 12 and disposed in a parallel plane to the axes of the openings 13 and 15, is a partition 30, which has an edge of the U-shaped partition member 28 secured thereto. A chamber is thereby provided which is surrounded by the top of the partition member 28, the top of the casing 12, one of the sides of the casing and the partition 30. Two chambers are also provided immediately beneath the valve heads 21, one of which connects with the opening 13 and the other with the opening 15.

Extending from the bottom of the casing 12 in an upward and horizontal direction with its edges secured to the partition 30 and a side of the casing, is a U-shaped partition member 31 which encloses a chamber located around one of the valve stems 25, and which is provided with a hole that forms a seat for one of the valve heads 26.

Extending from the top of the casing 12 in a downward and horizontal direction with its edges secured to the partition 3 and a side of the casing, is a partition member 32 which encloses a chamber located above one of the valve heads 26, and which is provided with a hole that forms a seat for the said valve head. The partition members 31 and 32, a side of the casing 12, the top and bottom of the casing and the partition 30 encloses a chamber through which a quantity of compressed air may pass.

Extending vertically above the valve heads 21 and 26 are movable pins 33, which rest on the said valve heads and are adapted to force them downwardly, as will be later described. The pins are held in position by lugs 34 extending downwardly from the top of the casing 12 and by nuts 35 which are screwed into projections 36 located above the said casing. The said pins extending movably through the said lugs and nuts, and are adapted to be forced downwardly by a lever member 37 which is pivoted above the casing on a pin 38 which extends through the said member and a projection 39 located on the top of the said casing. The lever 37 is provided with an operating handle 39′ and is so positioned on the casing that when it is moved in one direction it presses against two of the pins 33 located above one of the valve heads 21 and one of the valve heads 26, thereby causing the said valve heads to open, and when it is moved in the opposite direction it presses against the other two pins 33 which are located above the other two valve heads 21 and 26, thereby allowing the first two mentioned valve heads to close and causing the last two mentioned valve heads to open.

In operation, the handle 39′ upon being moved toward the opening 13 causes the lever member 37 to move on its pivot and force two of the pins 33 downwardly, thereby causing the valve heads 26 and 21 which are located adjacent openings 14 and 13 to become unseated. A quantity of compressed air supplied by the pipe 11 enters the casing 12 through the opening 14 and passes upwardly through the hole located in the partition member 31, around one of the valve heads 26, and out through the opening 17 into pipe 10, which delivers it to the tank 8. The compressed air so entering the tank forces a quantity of oil located therein through the pipe 9, from which it is delivered to the inside of the casing 12 through opening 13. The oil entering the casing passes upwardly around the valve head 21 which has been forced downwardly by a pin 33, and through the opened hole located in the partition member 28. The said oil thereafter proceeds to the part of the chamber located above the other valve head 21, and forces the said valve head downwardly, after which it passes through the hole in the partition member 28 located adjacent the said valve head, and out through opening 15 into the pipe 6. The pipe 6 delivers the oil to the casing 1, after which it proceeds to the bottom thereof through the grooves located in the wall of the said casing and exerts the necessary force on the bottom of the ram 4 to properly elevate it and the load located on the rack 5.

After the ram has been so elevated, the same may be lowered by moving the handle 39′ in the opposite direction to that previously indicated. Upon moving the handle 39′ toward the opening 15 the valve head 26, the valve heads 21 and 26 which were not previously, by the first described movement of the handle, forced open by the pins 33, are now pressed downwardly by the said pins, thereby allowing the compressed air located in the valve 7 to pass upwardly through the hole in the partition member 32 and escape through the opening 16 located in the casing 12. The valve head 21 located adjacent the opening 15 is forced downwardly, and the oil heretofore located in the casing 1 is forced through the pipe 6 by the load on the ram, and into the casing 12 through the opening 15 located therein. The oil so coming back into the casing 12, passes upwardly around the valve head 21, through the opening located in the partition member 28; thereafter forcing the other valve head 21 downwardly and passing through the other opening in the partition member 28, from whence it proceeds through the opening 13 and pipe 9 back into the tank 8.

Although I have described my invention with considerable detail it is apparent to those skilled in the art that the same may be embodied in other forms having similar constructions and similar modes of operation. I therefore do not desire my invention confined to the exact construction shown and described but desire it to be included broadly within the spirit of the appended claims.

Having described my invention, what I claim is:

1. In a control valve, a casing having a plurality of openings in its sides, a vertical partition extending from the top to the bottom of the casing, a longitudinally extending partition located at one side of the vertical partition between the top and bottom of the casing and having a plurality of openings therein, a plurality of partitions located in the casing at the opposite side of the vertical partition, each having an opening therein, and means movably associated with the openings in the partitions for closing and opening the said openings therein, whereby quantities of compressed air and liquid may be allowed to pass through the casing in certain directions at given times.

2. In a control valve, a casing having a plurality of openings in its sides, a vertical partition extending longitudinally through the casing, a plurality of horizontally disposed partitions located in the casing at the sides of the vertical partition, whereby the casing is divided into a plurality of chambers and means located in the horizontal partitions for allowing compressed air and liquid to flow through the casing in certain directions at certain times.

3. In a control valve, a casing having a plurality of openings in its sides, a vertical partition extending longitudinally through the casing from the top to the bottom thereof, a plurality of partitions located in the casing with edges thereof secured to the vertical partition, whereby a plurality of passageways communicating with the openings in the casing are formed inside the casing, and means for controlling the movement of compressed air and liquid through the passageways.

4. In a control valve, a casing having a plurality of openings in its sides, a partition extending longitudinally through the casing and from the top to the bottom thereof, a plurality of partitions located in the casing at the sides of the first mentioned partition having openings therein which allow quantities of liquid and compressed air to pass from one side of each of the last named partitions to its opposite side, and means for closing certain of the openings in the partitions and opening others by one and the same operation.

5. In a control valve, a casing having a plurality of openings therein, a vertical partition extending lengthwise through the casing from the top to the bottom thereof, a horizontal partition located in the casing at one side of the vertical partition and having an opening therein, a plurality of partitions located in the casing at the other side of the vertical partition, each of which has an opening therein, a plurality of valve heads movably associated with the openings in the partitions, a plurality of pins movably supported by the casing and in contact with the valve heads, and a lever member movably mounted on the casing, which said member is adapted to be moved in certain directions against certain of the pins at certain times, whereby certain of the valve heads may be removed from the openings in the partitions at certain times.

6. In a control valve, a casing having a plurality of openings therein, a partition extending from the top to the bottom of the casing, a horizontal partition located at one side of the first mentioned partition, a plurality of horizontal partitions located at the opposite side of the said first mentioned partition, the said horizontal partitions having openings therein, means associated with the openings in the partitions for opening and closing the same, and means for actuating the first mentioned means.

7. A valve mechanism to control a hydraulic lift of the type operated by liquid under gas pressure, said valve mechanism comprising a casing, a plurality of valves therein, one for controlling the flow of compressed gas to drive the liquid forward, one for controlling the exhaust of compressed gas to permit the liquid to return, and one for controlling the return of liquid, said air valves being check-valves arranged to be held normally closed by the pressure of the gas thereagainst, a dead-man control lever for all of said valves and normally returned to and retained in neutral position by the air valves when in closing and closed position and arranged to open one of said air valves when moved from neutral in one direction and to open the other air valve and the liquid valve when moved from neutral in the opposite direction.

8. A valve mechanism to control a hydraulic lift of the type operated by liquid under gas pressure, said valve mechanism comprising a casing, a plurality of check-valves therein, one for controlling flow of compressed gas to drive the liquid forward, one for controlling exhaust of compressed gas to permit the return of liquid, and one to control the return of liquid, each of said valves being arranged to be held normally closed by the pressure of fluid thereagainst, a stem for each valve projecting through the casing, and a control means co-operating with said stems and arranged to open one air valve when in one position and to open the other air valve and the liquid valve when in the opposite position, said control means being free to move to neutral position in response to the closing movement of the valves when pressure is applied thereagainst, whereby to provide a dead-man control.

9. A valve mechanism for hydraulic lifts operable by liquid actuated by gas, comprising a casing having a gas conduit and a liquid conduit, normally closed valves to control flow through said conduits on selectively opening said valves, one of said valves being closable by fluid pressure thereat, and manually operable means having a neutral and two operative positions and being normally in neutral position by virtue of the pressure against said valve, said valve on the one hand and said means on the other hand being mutually operable, said means selectively opening different valves on movement to said operative positions, said valve on being closed by pressure moving said means to neutral position, whereby on release of said means flow through said liquid conduit will cease.

JOHN D. COCHIN.